United States Patent

[11] 3,588,459

[72] Inventor Lawrence Dilger
South Croydon, Surrey, England
[21] Appl. No. 842,411
[22] Filed Jan. 27, 1969
[45] Patented June 28, 1971
[73] Assignee Veeder Industries Inc.
Hartford, Conn.
[32] Priority Jan. 26, 1968
[33] Great Britain
[31] 4246/68

[54] HIGH SPEED COUNTER WITH ELECTROMAGNETICALLY OPERATED DISPLAY
11 Claims, 1 Drawing Fig.

[52] U.S. Cl. ........ 235/92
[51] Int. Cl. ........ G06m 3/12
[50] Field of Search ........ 235/92, 50, 55, 70

[56] References Cited
UNITED STATES PATENTS 3,391,275 7/1968 Bullock ........ 235/151.1
3,504,290 3/1970 Earle ........ 328/164
3,319,054 5/1967 Kelling ........ 235/154

*Primary Examiner*—Daryl W. Cook
*Assistant Examiner*—Robert F. Gnuse
*Attorney*—Baldwin, Wight, Diller & Brown

ABSTRACT: A combined electronic and electromagnetic high speed counter wherein a decade counts least significant digits and also provides frequency divided output pulses to a register of electromagnetic counters. A single electromagnetic counter hunts on the count of the decade during high speed operation and is brought into register either at low counting speeds or when the input pulses cease. The decade is brought into register with the count stored on the single electromagnetic counter if the decade count is lost. A comparator compares the count on the decade and said single electromagnetic counter and supplies output pulses to a logical circuit. The logical circuit includes and controls a correcting pulse generation for correctly indexing the decade and the single electromagnetic counter.

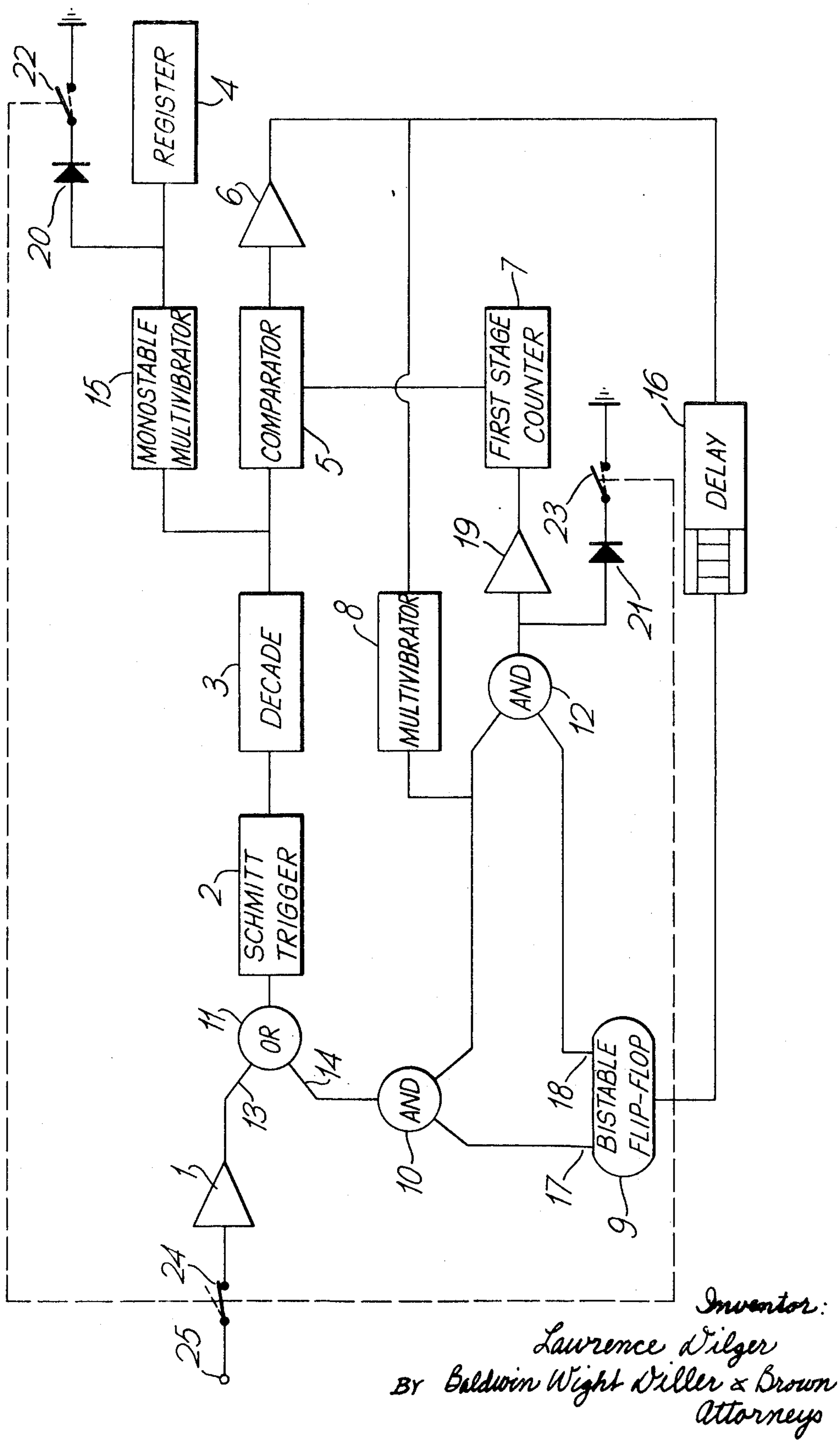
Inventor:
Laurence Dilger
BY Baldwin Wight Diller & Brown
Attorneys

HIGH SPEED COUNTER WITH ELECTROMAGNETICALLY OPERATED DISPLAY

This invention relates to electronic means for enabling a register of electromagnetic counters to record counting pulses having a repetition rate exceeding the maximum operating limit of the counter which records the least significant digit.

The maximum operating speed of the mechanical parts of a conventional electromagnetic counter may limit its counting rate to some 2,500 counts per minute (c.p.m.). Higher counting speeds may be achieved by preceding the electromagnetic counter with an electronic system to reduce the counting rate by a predetermined factor. For example, an electromagnetic counter having a top speed of 2,500 c.p.m., may be preceded by an electronic system which provides an output pulse for every 10 input pulses, the tenth pulse being supplied to the electromagnetic counter. The electronic system can be provided with a digital display operated by and recording each input pulse. Thus, the combined electronic system and counter provides an apparatus which is capable of counting pulses up to a maximum input rate of 25,000 c.p.m. However, such an apparatus has the inherent disadvantage that the least significant digit recorded by the electronic digital display may not be stored if the electrical power supply to the system is switched off. For example, if the system is switched off and then turned on, the electronic digital display will record some random number thus making the previously recorded total count incorrect.

The present invention employs an electronic system whereby the true total count can be displayed on a register of electromagnetic counters, even though the counting rate may exceed the maximum performance of the counter which records the least significant digit.

A particular advantage of the present invention is that a first electromagnetic counter is used to record the least significant digit when counting a train of input pulses, and is used to store the count of the least significant digit if the electricity supply to the whole system is turned off. The count is stored by the first electromagnetic counter until the power supply is reconnected, and then an electronic counter which normally counts the least significant digit, is automatically brought to the same count as the first electromagnetic counter.

According to the present invention, a high speed counter having an electromagnetically operated display for recording the total count of a train of input pulses of a first frequency, comprises electronic counting means for counting the input pulses and capable of generating first signals each of which represents the state of the count at the electronic counting means and also capable of generating output counting pulses having a second frequency which is a multiple of the first frequency, a first stage electromagnetic counter capable of generating second signals each of which represents a digit displayed by the first stage counter, a register including a plurality of second stage electromagnetic counters capable of being indexed by the output pulses of the second frequency, the second frequency being equal to or less than the maximum pulse counting rate of that second stage counter which counts the least significant digit in the register, electronic comparison means for comparing said first and second signals and capable of generating third signals when the first and second signals do not correspond digitally, and logical means connected to a pulse generator for generating correcting pulses to index correctly the electronic counting means or the first stage counter when either are not indicating the correct count of input pulses which have been supplied to the high speed counter.

An example of the invention is described with reference to the accompany drawing which illustrates schematically a block diagram of a high speed counter.

The apparatus illustrated in the drawing includes three main circuits which will first be described briefly, followed by a detailed description of the complete circuit. The three main circuits comprise:

a. An electronic decade 3 for counting input pulses supplied via a Schmitt trigger 2, the decade 3 supplying output pulses to and indexing a register 4 having a plurality of second stage single wheel electromagnetic counters.
b. A first loop comprising a comparator 5, a multivibrator 8, and AND gate 12, and a first stage single wheel electromagnetic counter 7.
c. A second loop comprising the decade 3, the comparator 5, the multivibrator 8, an AND gate 10, an OR gate 11, and the Schmitt trigger 2.

The decade 3 of circuit (a) provides electronic means for counting each input pulse and transmitting a signal corresponding to the state of the count, and for deriving an output pulse on every tenth input pulse to index one of the electromagnetic counters of the register 4. The decade 3 thus reduces the input count rate by a factor of 105 and when the input pulses terminate, the register 4 displays the total count of input pulses less the least significant digit of the total count. The first electromagnetic counter wheel (not shown) of the register 4, counts every tenth input pulse, and as many other counter wheels may be provided in the register for recording the higher order digits of the required total count.

Circuit (b) provides electronic means for synchronizing the count between the decade 3 and the first stage single wheel electromagnetic counter 7. The decade 3 generates first signals each of which correspond to the state of the count at the decade. These first signals are fed to the comparator 5 and are thereby compared with second signals derived from the first counter 7. The first counter 7 is provided with means such as a brush running on a carbon track for deriving the second signals, each of which signals correspond to the state of the count at the first counter 7. If the first and second signals arriving at the comparator 5 do not correspond i.e. by representing the same state of count, third signals are derived from the comparator 5 to trigger the multivibrator 8. Logical circuits including the AND-gate 12 control the multivibrator 8, so as to permit correcting pulses to be supplied to the first counter 7 until its count is synchronized with that of the decade 3.

When the system is operating with a relatively low input pulse rate i.e. a rate equal to or below the maximum rate at which the first counter 7 can truly respond, the first counter 7 will record the same count as the decade 3. If the counting rate increases and input pulses are applied to the decade at a rate higher than the maximum true response rate of the first counter 7, the first counter will hunt on the third signal generated by the comparator 5. When the input pulse rate decreases to a sufficiently low value, or the input pulses are terminated, the count on the single wheel counter is synchronized with the count on the decade 3. Correcting pulses derived by the multivibrator 8, and controlled by logical circuits including the AND gate 12 synchronize the two counts. The multivibrator 8 is then switched off.

Circuit (c) provides electronic means for synchronizing the state of a stored count at the first counter 7, with the count at the decade 3. If the power supply to the decade is switched off after the apparatus has recorded a total count, the count at the decade will reach a random number when the power supply is reconnected. However, circuit (c) then causes the decade 3 to be brought to the same count as that stored on the first counter 7, before the apparatus is supplied with further input pulses. In order to synchronize the decade 3 with the first counter 7, the comparator 5 compares the count at the decade (zero) with the count at the first counter 7. If the counts are different, third signals are generated by the comparator. The multivibrator 8 controlled by the logical circuits including the AND gate 10, and the OR gate 11 then supplies correcting pulses to the decade 3 until the counts are synchronized. The multivibrator 8 is then switched off.

Considering the circuit as a whole, pulses to be counted are supplied at an input terminal 25, and amplified by an amplifier 1. The OR gate, 11, provided with two input terminals 13 and 14, allows the amplified pulses to pass via terminal 13 to the Schmitt trigger 3, only when no other pulses are present at terminal 14. The Schmitt trigger 2 supplies constant amplitude input pulses to the electronic decade 3. The decade 3 may be any suitable "scale of ten" counter, for example, four binary stages incorporating feedback, and capable of supplying an output pulse on every 10th input pulse. The decade 3 is also provided with means to transmit first signals each of which represent the state of the count at the decade. These first signals are supplied to an input of the comparator 5. The output pulses form the decade 3 are counted at the register 4 which is provided with a number of single wheel electromagnetic counters which count the tens, hundreds, and higher order digits of the input pulses. A monostable multivibrator 15 is provided between the register 4 and the decade 3, which is triggered by every output pulse from the decade 3, which is triggered by every output pulse from the decade, (i.e. at every 10th input pulse to the decade), in order to supply a counting pulse having a duration of at least 15 milliseconds to the register 4. The multivibrator 5 supplies a pulse of sufficient duration to operate the single wheel counters of the register 4.

The first stage single wheel counter 7 provides a digital display of the least significant digit in the count. It is also provided with means to derive second signals each of which represents the digit displayed. The second signals are supplied to the other input of the comparator 5 and compared with the first signals from the decade 3. When the first and second signals do not correspond, third signals are derived from the output of the comparator 5. The third signals are then amplified by an amplifier 6 and the amplified signals are fed to the multivibrator 8 and a 1 microsecond delay unit 16.

A bistable multivibrator 9 is provided with two output terminals 17 and 18 corresponding to the two stable states of the multivibrator. A pulse present at either terminal will be defined by a "1" and the absence of a pulse by a "0." Normally, the output 17 is at "1," and output 18 at "0." When signals are applied to the input of the multivibrator 9 from the delay 16, the state of the multivibrator 9 will change to "0" at terminal 17, and "1" at terminal 18. The pulse at terminal 18 is supplied to an input of the AND gate 12, and since the multivibrator 8 has also been triggered by the signal from the amplifier 6, it has been caused to oscillate, and thus supplies pulses to the other input of the AND gate 12. The AND gate 12 becomes conductive and pulses from the multivibrator 8 are amplified by an amplifier 19 so as to drive the first stage counter 7. The counter 7 is then brought to the same count as the decade. When the counts correspond, the third signals from the comparator 5 cause a signal from the amplifier 6 to revert the multivibrator 9 to "1" at terminal 17, and "0" at terminal 18, the multivibrator 8 stops oscillating, and the AND gate 12 stops conducting. The count at the decade and that at the first counter will remain identical as long as the power supply is switched on. However, if the power supply to the counter is switched off, the true count at the decade will be lost. If at a later stage the power supply is reconnected, the decade 3 will be triggered to some random count. The first signal from the decade 3 is then compared with the second signal from the first counter, and if the counts do not correspond, third signals are generated at the output of the comparator 5.

The third signals generated by the comparator 5 cause a positive DC level from the amplifier 6 to bias the multivibrator 8 so that it begins to oscillate. As the output 17 of the bistable multivibrator 17 is normally at "1, " pulses from the output of the multivibrator 8 cause the AND gate 10 to open. Pulses from the multivibrator 8 then pass via the AND gate 10 to, the OR gate 11, and the Schmitt Trigger 2, and drive the decade 3. The decade 3 is thus brought to the same count as the first counter 7, and when the counts coincide the DC level of the amplifier 6 falls to zero, the multivibrator 8 stops oscillating, and the negative edge of the signal from the amplifier 6 triggers the bistable multivibrator 9 via the 1 $\mu$sec. delay 16. The output terminal 18 of the bistable multivibrator 9 then changes to "1." The maximum settling down period for the above operation is 300 milliseconds.

If a train of input pulses is now supplied at the input 25, the decade 3 will go out-of-step with the first stage counter 7, and as a result of a third signal from the comparator 5, the amplifier 6 supplies a positive DC level to the multivibrator 8 causing it to oscillate. Since the output 18 of the bistable multivibrator 9 is at "1," the AND gate 12 conducts in response to pulses from the multivibrator 8, which pulses are amplified by the amplifier 19, so as to drive the first stage counter 7, at the rate at which the amplifier 6 changes its DC level. The change of voltage of amplifier 6 over a given time (1 second) will always be equal to the frequency of the input pulses.

The OR gate 11 is provided to allow input pulses to pass from the amplifier 1 to the Schmitt trigger 2, or to allow correcting pulses to pass from the multivibrator 8 and the AND gate 10 to the Schmitt trigger 2.

In order to prevent incorrect counting as a result of uncertain switching at the input of the counter, diodes 20 and 21 are respectively connected to switches 22 and 23, the switches 22 and 23 being ganged with an input switch 24. When this input switch 24 is opened, switches 22 and 23 are simultaneously opened to isolate the electromagnetic counters in the register 4, and the first stage electromagnetic counter 7.

When the counter is switched on, it is necessary to delay applying a train of input pulses to the counter for a short time, while transient changes in the circuit take place. It has been found that a 300 millisecond delay is suitable in one practical form of the apparatus. Such a delay can be considered quite acceptable for most applications of the counter, when compared against the usual response time of mechanical switches.

I claim:

1. A high speed counter having an electromagnetically operated display for recording the total count of a train of input pulses of a first frequency, comprising electronic counting means for counting said input pulses and capable of generating first signals each of which represents the state of the count at said electronic counting means and also capable of generating output counting pulses having a second frequency which is a multiple of said first frequency, a first stage electromagnetic counter capable of generating second signals each of which represents a digit displayed by said first stage counter, a register operatively connected to said electronic counting means and including a plurality of second stage electromagnetic counters capable of being indexed by said output pulses of said second frequency, said second frequency being equal to, or less than the maximum pulse counting rate of that second stage counter which counts the least significant digits in said register, electronic comparison means connected between said electronic counting means and said first stage counter for comparing said first and second signals and capable of generating third signals when said first and second signals do not correspond digitally, and logical means for controlling a pulse generator connected to said comparison means, said generator being provided for generating correcting pulses to index correctly said electronic counting means or said first stage counter when either are not indicating the correct count of input pulses which have been supplied to said high speed counter, said logical means being operatively connected to said electronic counting means, said first stage counter and said comparison means.

2. The counter according to claim 1 wherein said logical means is provided for connecting said pulse generator either to said first stage counter, or said electronic counting means when said third signals are supplied to said logical means, said first stage counter being driven by correcting pulses when said pulse generator is connected thereto until the state of the count at said first stage counter corresponds to the state of the count at said electronic means, and said electronic means being driven by correcting pulses when said pulse generator is connected thereto until the state of the count at said electronic means corresponds to the state of the count at said first stage counter.

3. The counter according to claim 1 wherein said first stage counter includes a counter wheel or disc, and said second stage counters include counter wheels or discs, said wheels or discs having a sequence of digital numbers represented thereon.

4. The counter as claimed in claim 1 wherein said electronic comparison means is a comparator to which said first and second signals are supplied.

5. The counter as claimed in claim 1 wherein said logical means comprises an OR gate having an input for receiving said input counting pulses at said first frequency and having an output operatively connected to said electronic counting means for supplying counting pulses said electronic counting means, a first AND gate having its output connected via an amplifier to said first stage counter, a second AND gate having its output connected to the other input of said OR gate, one input of each first and second AND gates being commonly connected to said pulse generator, a bistable flip-flop connected to an amplifier which is connected to said electronic comparison means, the other inputs of said first and second AND gates being separately connected to respective outputs of said bistable flip-flop.

6. The counter according to claim 1 wherein said electronic counting means comprises a Schmitt Trigger connected to an electronic decade, said decade being connected to said register via a monostable multivibrator, said second frequency being one-tenth of said first frequency, and said second stage counters being decimally based and sequentially arranged in ascending decimal orders.

7. A high speed counter having an electromagnetically operated display for recording the total count of a train of input pulses of a first frequency, a Schmitt Trigger connected to an electronic decade for counting input pulses and capable of generating output counting pulses and frequency divided pulses at one-tenth the frequency of said input pulses, a register of electromagnetic counters for indexing by said frequency divided pulses, said register being connected to said decade via a monostable multivibrator, a first stage electromagnetic counter for counting said input pulses and capable of generating counting signals, said first stage counter being connected to a comparator which is also connected to said decade, said comparator being provided for comparing the count on said decade with that on said first stage counter and thereby generating signals when said decade and first stage counter do not correspond digitally, logical means operatively connected to said comparator for receiving said latter signals, said logical means including an OR gate having an input for receiving said input counting pulses and having an output operatively connected to said decade for supplying said input counting pulses thereto, a first AND gate having its output connected via an amplifier to said first stage counter, a second AND gate having its output connected to the other input of said OR gate, one input of each first and second AND-gates being commonly connected to a pulse generator for generating correcting pulses to index correctly said decade or said first stage counter when either are not indicating the correct count of said input pulses, a bistable flip-flop operatively connected via an amplifier to said comparator, the other inputs of said first and second AND-gates being separately connected to respective outputs of said bistable flip-flop, said first stage counter being driven by said correcting pulses when said pulse generator is connected thereto and said decade being driven by said pulse generator when the pulse generator is connected thereto, to correctly index respectively said first stage counter and said decade.

8. The counter according to claim 7 wherein a diode and a first series connected switch are connected between the input to said register and ground, and another diode and a second series connected switch are connected between the output of said first AND gate and ground, both of said switches being ganged to an input switch which is connected in series with the pulse input to said OR gate such that when said input switch is opened to isolate said high speed counter from said input counting pulses, said first and second switches simultaneously operate to prevent said register and said first stage counter respectively from recording transient signals in said decade or said first stage counter as true counting signals.

9. The counter according to claim 8 in which a delay circuit is connected between said amplifier which is connected to said comparator and said bistable flip-flop, the delay time of said delay circuit being greater than the period in which after energizing said high-speed counter subsequent transient signals generated therein decay to a negligible value, said delay circuit being provided to offset an incorrect count being recorded by said high-speed counter due to said transient signals.

10. The counter as claimed in claim 9 wherein said pulse input to said OR gate is preceded by an amplifier.

11. The counter as claimed in claim 7 wherein said pulse input to said OR gate is preceded by an amplifier.